(12) United States Patent
Roiss et al.

(10) Patent No.: US 10,040,008 B2
(45) Date of Patent: Aug. 7, 2018

(54) SCREW PRESS SEPARATOR

(71) Applicant: Röhren- und Pumpenwerk Bauer Ges.m.b.H., Voitsberg (AT)

(72) Inventors: Otto Roiss, Graz (AT); Dietrich Eichler, Königstein (DE)

(73) Assignee: Röhren-und Pumpenwerk Bauer Ges.m.b.H. (AT)

( * ) Notice: Subject to any disclaimer, the term of this patent is extended or adjusted under 35 U.S.C. 154(b) by 382 days.

(21) Appl. No.: 14/786,452

(22) PCT Filed: Mar. 27, 2014

(86) PCT No.: PCT/EP2014/056143
§ 371 (c)(1),
(2) Date: Oct. 22, 2015

(87) PCT Pub. No.: WO2014/173612
PCT Pub. Date: Oct. 30, 2014

(65) Prior Publication Data
US 2016/0067637 A1    Mar. 10, 2016

(30) Foreign Application Priority Data
Apr. 24, 2013    (DE) .................. 20 2013 003 874 U

(51) Int. Cl.
*B01D 29/90* (2006.01)
*B01D 29/23* (2006.01)
*B01D 29/35* (2006.01)
*B01D 29/11* (2006.01)
*B01D 29/82* (2006.01)
(Continued)

(52) U.S. Cl.
CPC ............ *B01D 29/90* (2013.01); *B01D 29/111* (2013.01); *B01D 29/118* (2013.01); *B01D 29/23* (2013.01); *B01D 29/35* (2013.01); *B01D 29/6476* (2013.01); *B01D 29/82* (2013.01); *B01D 29/828* (2013.01); *B30B 9/26* (2013.01)

(58) Field of Classification Search
CPC ..... B01D 29/111; B01D 29/118; B01D 29/23; B01D 29/35; B01D 29/6476; B01D 29/90; B01D 29/82; B01D 29/828; B30B 9/26
See application file for complete search history.

(56) References Cited

FOREIGN PATENT DOCUMENTS

| DE | 10246397 B4 | 7/2009 |
|---|---|---|
| DE | 202011105765 U1 | 12/2011 |
| DE | 102011080865 A1 | 2/2013 |

OTHER PUBLICATIONS

Jul. 4, 2014, International Search Report of the International Searching Authority from the European Patent Office in PCT/EP2014/056143, which is the international application to this U.S. national phase application.

(Continued)

*Primary Examiner* — John Kim
(74) *Attorney, Agent, or Firm* — Kolisch Hartwell, P.C.

(57) ABSTRACT

The present disclosure may include a press screw separator configured for separating solid components from a slurry containing solid and liquid components. The separator may include a housing, a frame arranged in the housing, and a cylindrical screen which is arranged at least partially in the frame. The separator may also include a screw adapted for pressing out the slurry, which screw may be arranged within the screen and mounted so as to be rotationally movable about a longitudinal axis of the screen. The frame may be mounted in the housing without any clearance.

18 Claims, 2 Drawing Sheets

(51) Int. Cl.
*B01D 29/64* (2006.01)
*B30B 9/26* (2006.01)

(56) References Cited

OTHER PUBLICATIONS

Jul. 4, 2014, Written Opinion of the International Searching Authority from the European Patent Office in PCT/EP2014/056143, which is the international application to this U.S. national phase application.

Jul. 4, 2014, Communication Regarding the Transmission of the International Search Report and the Written Opinion of the International Searching Authority or Declaration from the European Patent Office in PCT/EP2014/056143, which is the international application to this U.S. national phase application.

SCREW PRESS SEPARATOR

CROSS-REFERENCE TO RELATED APPLICATIONS

This application is a national phase application of PCT/EP2014/056143, filed Mar. 27, 2014, which claims priority to German Patent Application No. 202013003874.8, filed Apr. 24, 2013, each of which is hereby incorporated by reference.

INTRODUCTION

The present invention relates to a press screw separator for separating solid components from a slurry containing solid and liquid components.

Press screw separators are used for pressing out a slurry. The slurry can be in particular liquid manure or wastewater. The wastewater can come from municipal and industrial plants, wherein this wastewater is always to be separated into solid and liquid components. Typically arranged in the housing of the press screw separators is a cylindrical screen, within which a screw rotates. The screw conveys and presses the slurry through the press screw separator. The liquid portions of the slurry pass through the screen while a solid slug is formed within the screen. The rotating screw conveys the solid slug to one end of the press screw separator to be discharged at this location. The torque is transmitted from the screw to the screen via the solid slug. Therefore, the screen must be arranged in the housing for conjoint rotation therewith.

However, it has been shown that when solids having a high dry content are pressed out, a high pressing-out force acts upon the screen. Therefore, a failure of the screen often cannot be ruled out. However, a failure of the screen results in the breakdown of the complete press screw separator or causes damage thereto.

The object of the present invention is to provide a press screw separator which is simple and cost-effective to produce and permits safe, reliable and low-maintenance operation.

This object is achieved by the independent claim. The dependent claims contain advantageous developments of the invention.

Therefore, the object is achieved by a press screw separator which comprises a housing, wherein a frame is arranged in the housing. In accordance with the invention, provision is made that the frame is received in the housing without any clearance. The frame at least partially receives a cylindrical screen. Furthermore, the press screw separator in accordance with the invention comprises a screw for pressing out the slurry, which screw is arranged within the screen and is mounted so as to be rotationally movable about a longitudinal axis of the screen. In accordance with the invention, the screen is thus cylindrical in formation, wherein the frame is preferably also cylindrical in formation. The frame in accordance with the invention permits a partial stabilisation of the screen so that the screen can absorb considerably higher forces than would be the case without the frame.

In an advantageous manner, the frame is mounted without any clearance in the housing in a circumferential direction of the frame. In this manner, the frame can absorb high forces and transfer same into the housing. Therefore, high forces which occur in the screen can be absorbed so as to prevent damage to the screen as a result of an overload. In this way, the aforementioned stabilisation of the screen can be achieved.

In a preferred development, the frame is screwed to the housing. Therefore, the frame is preferably fixed immovably in the housing. The screw connection can simply then be released, e.g. in order to dismantle the press screw separator, which may be required in particular for cleaning purposes. In addition, the screw connection ensures that the frame is prevented from being rotated about the longitudinal axis of the screen.

Furthermore, provision is preferably made that the frame comprises at least one reinforcing strip which extends in parallel with the longitudinal axis. In particular, provision is made that the reinforcing strip is provided with boreholes, threaded holes and/or threaded rods, by way of which the frame, as previously described, can be screwed to the housing. In particular, the reinforcing strip renders it possible to form the frame in a very stiff manner, whereby in particular a deformation of the screen together with the frame can be prevented.

In an advantageous manner, a first screen region of the screen is mounted directly in the housing, whereas a second screen region of the screen is mounted in the frame. Therefore, the arrangement in accordance with the invention as per this development makes it possible to provide the reinforcing frame only at those locations of the screen, at which particularly high forces occur and which are thus the potential failure locations. The first screen region which is not surrounded by the frame can also be mounted in a very simple manner directly in the housing.

In a particularly preferred manner, provision is made that the first screen region is designed to be elastically deformable. In particular, the first screen region can deform elliptically so that a spaced interval between the screen and the screw is reduced. However, direct contact between the screen and the screw is avoided. In this manner, the screw can remove pressed-out solid material which accumulates on the screen, thus preventing the screen from becoming soiled and therefore blocked.

In a particularly preferred manner, the frame is arranged to mount the second screen region without any clearance and/or to prevent deformation of the second screen region. Therefore, the frame can support the screen in the second screen region so that in this case the screen cannot be deformed and therefore cannot fail. In order to still ensure the functionality of the screen, provision is made in a particularly preferred manner that the frame is constructed in a grid-like manner, in particular comprising a perforated sheet-metal plate. The second screen region is in particular the region of the screen, in which the largest dry contents occur within the press screw separator. This means that in the second screen region the slurry is separated substantially into the solid and liquid components thereof and the slug is formed.

In an advantageous manner, the second screen region comprises a recess in the direction of the longitudinal axis. In a preferred manner, a lug of the frame can engage into this recess in order to prevent rotation of the second screen about the longitudinal axis with respect to the frame. Since, as described in the introduction, the rotation of the screw is transmitted to the screen, it is possible in this manner to prevent torsion within the screen. It is thus possible to keep unnecessary stresses away from the screen. Furthermore, the lug can be designed for mounting the screen within the frame. Alternatively or in addition, the lug can be designed for clamping the screen within the frame. This can occur in particular by virtue of the fact that the screen comprises a cylindrical main body, wherein a slot is present in parallel with the longitudinal axis over the entire peripheral surface. Therefore, a lug engaging into the slot and having a larger dimension than the slot can increase the outer diameter of the screen in order thus to press the screen into the frame.

In a preferred embodiment, the frame comprises a holding strip which can be connected to the rest of the frame. In a particularly preferred manner, the holding strip can be screwed to the frame. The lug of the frame can preferably be formed in this manner. This has the advantage that the lug of the frame can be removed, which facilitates e.g. the installation and/or removal of the screen.

Provision is also preferably made that the second screen region takes up a proportion of up to 30%, in particular of up to 50% of the screen. As previously described, the highest forces within the press screw separator occur within the second screen region. Therefore, in accordance with the invention, the second screen region is to be selected in accordance with said values in order to ensure that failure of the screen by reason of the occurrence of excessive forces is precluded.

In a further advantageous embodiment, the frame comprises at least one rib which extends in an arcuate manner about the longitudinal axis. Such a rib serves to stiffen the frame, whereby said frame can absorb higher forces than would be possible with the screen alone. Therefore, the rib can bring about an effective supporting effect of the frame.

Preferably, the screen comprises a multiplicity of bars which are oriented in parallel with the longitudinal axis. Such bar screens comprise advantageous properties in use in press screw separators, since in particular there are no elements which extend in the circumferential direction and which could be damaged by the solid slug conveyed by the screw.

The invention will be described in detail with reference to an exemplified embodiment taking into consideration the enclosed drawings, in which:

DETAILED DESCRIPTION OF THE DRAWINGS

Figure 1:
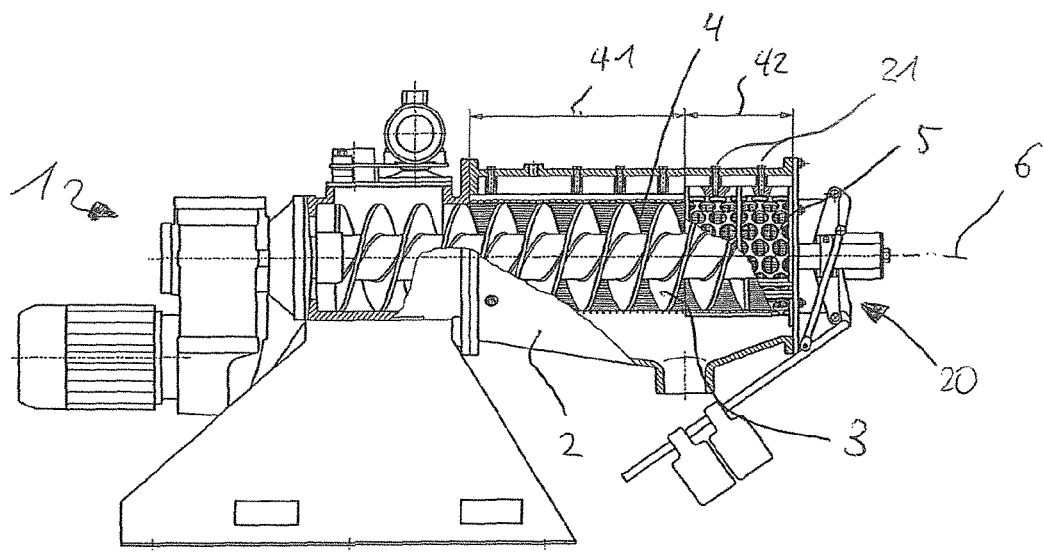
FIG. 1 shows a schematic view of a press screw separator in accordance with an exemplified embodiment of the invention.

FIG. 1 shows a press screw separator 1 which comprises a housing 2. Only those components of the housing 2 which are significant for the present invention will be described hereinafter. All of the remaining components correspond to those components used in the case of known press screw separators.

Arranged within the housing 2 is a screw 3 which includes in particular two circumferential helixes. The screw 3 serves to compact a slurry so that liquid components can be separated from solid components. For this purpose a screen 4 is provided which extends cylindrically about the screw 3. The screen 4 comprises a longitudinal axis 6 which at the same time is also the longitudinal axis of the screw 3. Furthermore, the screen 4 is divided into a first screen region 41 and a second screen region 42. The first screen region can comprise a design which differs from the design of the second screen region. Provision is also preferably made that the first screen region and the second screen region are installed separately from one another.

The first screen region 41 is mounted in the housing 2, as illustrated in patent document DE 102 46 397 B4. In the example illustrated in FIG. 1, the first screen region 41 is connected to the housing 2 via guide rails, not visible in FIG. 1, such that only tangential forces are transmitted, whereas during the deformation the screen can move freely in the radial direction.

The second screen region 42 is surrounded by a frame 5 and is mounted without any clearance within the frame 5. Furthermore, the frame 5 substantially prevents deformation of the second screen region 42. The second screen region 42 and the frame 5 are arranged directly upstream of an outlet 20 of the housing, since the highest forces act upon the screen 4 here. This results from the fact that the slurry is compacted over the longitudinal axis 6, wherein constantly liquid components pass through the screen 4 and the solid components of the slurry remain within the screen 4. Therefore, the dry content of the solid material located within the screen 4 increases continuously if the solid material moves closer to the outlet 20. The frame 5 prevents the second screen region 42 from being destroyed owing to the occurrence of excessively high forces. The second screen region 42 makes up approximately one third of the total length of the screen 4, which is sufficient for a protective function with the frame 5. Overall, safer and reliable operation is thus made possible, as the screen 4 is protected against failing.

The frame 5 is connected to the housing 2 without any clearance and in particular for conjoint rotation therewith. For this purpose, screw connections 21 are used which permit simple and cost-effective assembly of the frame 5 within the housing 2. Therefore, the second screen region 42 is mounted within the housing 2 for conjoint rotation therewith via the frame 5, without any clearance and in a non-deformable manner, whereas the first screen region 41 is mounted within the housing 2 in such a manner as to still be deformable, in particular in an elliptical manner.

Figure 2:
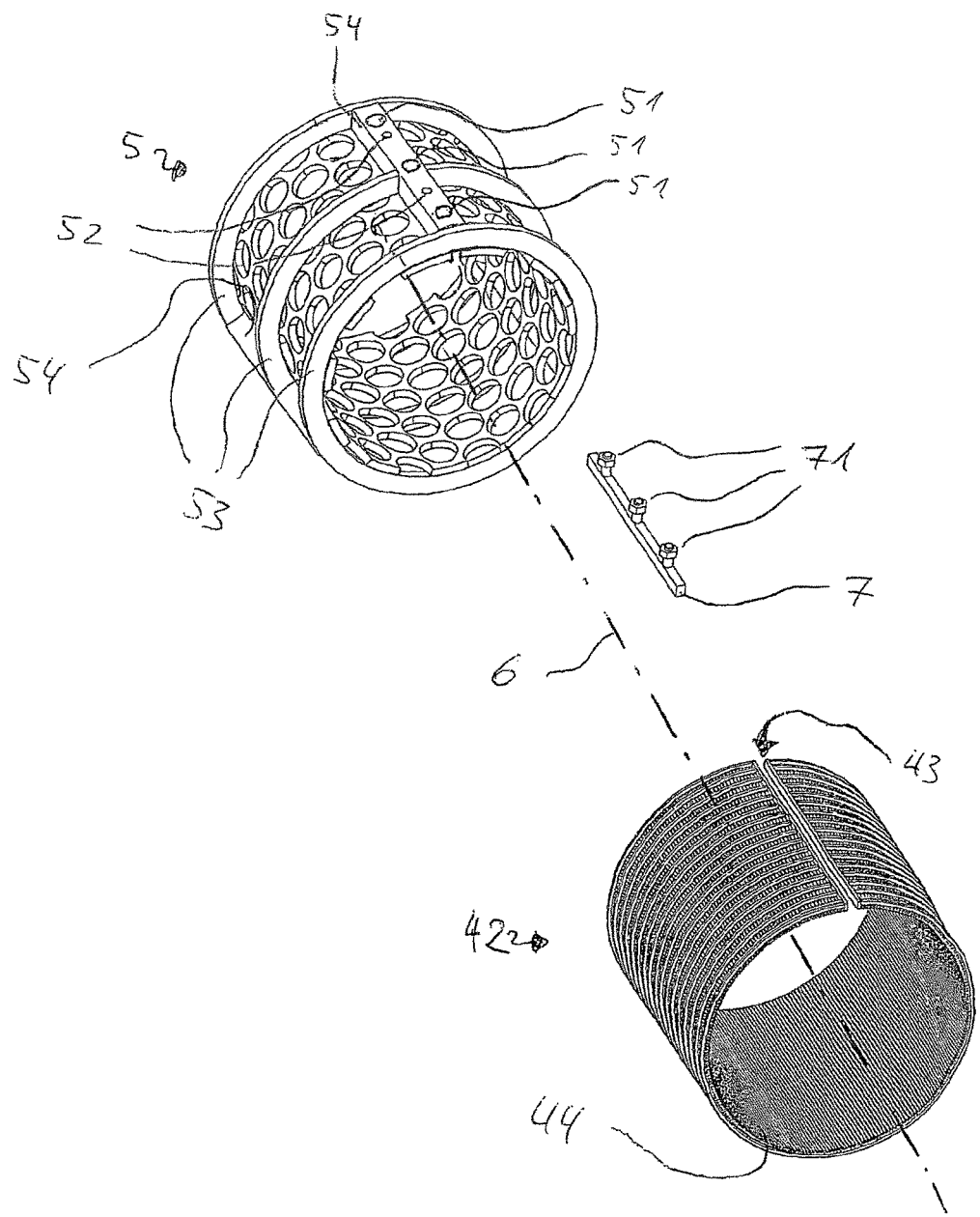
FIG. 2 shows a schematic view of the second screen region of the screen together with the frame of the press screw separator in accordance with the preferred exemplified embodiment of the invention.

FIG. 2 shows an exploded view illustrating the second screen region 42, the frame 5 and a holding strip 7 which forms a lug of the frame. It is apparent that the second screen region 42 comprises a recess 43 which extends over the entire peripheral surface of the second screen region 42 in parallel with the longitudinal axis 6 and is reinforced preferably by way of end strips. The holding strip 7 which can be screwed in particular to the frame 5 can engage into this recess 43. For this purpose, the frame 5 comprises a reinforcing strip 54 in which sink holes 51 are provided so that a screw connection of the holding strip 7 can be effected by way of a combination of screws and nuts 71 within the reinforcing strip 54. Therefore, it is possible in particular that the combinations of screws and nuts 71 of the holding strip 7 do not protrude beyond the reinforcing strip 54. It is likewise possible that the holding strip is connected to the reinforcing strip 54 by other fastening mechanism. This can be in particular a rivet connection or an adhesive connection. The frame 5 can comprise further reinforcing strips 54, wherein not every reinforcing strip 54 has to be provided with a holding strip 7. In particular, provision is made that only one holding strip 7 is arranged on the frame 5. The reinforcing strips 54 can also comprise threaded holes 52 which can be used for the screw connection 21 (cf. FIG. 1). Therefore, the frame 5 can be mounted within the housing 2 (cf. FIG. 1) without any clearance and in a rotationally fixed manner.

Finally, it is apparent from FIG. 2 that the frame 5 comprises reinforcing ribs 53. These ribs serve in particular to further stiffen the frame 5. This stiffening makes it possible for the frame 53 to absorb high forces from the second screen region 42. Therefore, a failure of the second screen region 42 and thus of the screen 4 is virtually precluded.

The screen 4 is designed in particular as a bar screen. Therefore, the screen 4 comprises a multiplicity of bars 44 which are oriented along the longitudinal axis 6. A spaced interval between the bars 44 serves to define a mesh width so that the quality of the solid material to be pressed out can be determined. The bars 44 are connected via a spiral-shaped support bar or a plurality of annular support bars which extend about the longitudinal axis 6.

The present invention may relate to a press screw separator (1) for separating solid components from a slurry containing solid and liquid components, comprising a housing (2), a frame (5) arranged in the housing (2), a cylindrical screen (4) which is arranged at least partially in the frame (5), and a screw (3) for pressing out the slurry, which screw is arranged within the screen (4) and is mounted so as to be rotationally movable about a longitudinal axis (6) of the screen (4), wherein the frame (5) is mounted in the housing (2) without any clearance.

The present disclosure may include one or more of the following concepts:

A. Press screw separator (1) for separating solid components from a slurry containing solid and liquid components, comprising
   a housing (2),
   a frame (5) arranged in the housing (2),
   a cylindrical screen (4) which is arranged at least partially in the frame (5), and
   a screw (3) for pressing out the slurry, which screw is arranged within the screen (4) and is mounted so as to be rotationally movable about a longitudinal axis (6) of the screen (4),
   wherein the frame (5) is mounted in the housing (2) without any clearance.
B. Press screw separator in accordance with paragraph A, characterised in that the frame (5) is mounted in the housing (2) without any clearance in the circumferential direction.
C. Press screw separator in accordance with paragraph A, characterised in that the frame (5) is screwed to the housing (2).
D. Press screw separator in accordance with paragraphs B or C, characterised in that the frame (5) comprises at least one reinforcing strip (54) which extends in parallel with the longitudinal axis (6).
E. Press screw separator in accordance with any of the previous paragraphs, characterised in that a first screen region (41) of the screen (4) is mounted directly in the housing (2), whereas a second screen region (42) of the screen (4) is mounted in the frame (5).
F. Press screw separator in accordance with paragraph E, characterised in that the first screen region (41) is designed so as to be elastically deformable.
G. Press screw separator in accordance with paragraphs E or F, characterised in that the frame (5) mounts the second screen region (42) without any clearance and/or prevents deformation of the second screen region (42).
H. Press screw separator in accordance with paragraph G, characterised in that the second screen region (42) comprises a recess (43) in the direction of the longitudinal axis (6), into which a lug of the frame (5) engages in order to prevent rotation of the second screen region (42) about the longitudinal axis (6).
I. Press screw separator in accordance with paragraph H, characterised in that the frame (5) comprises a holding strip (7) which can be connected, in particular screwed, to the frame (5) in order thus to form the lug of the frame (5).
J. Press screw separator in accordance with paragraphs E-I, characterised in that the second screen region (42) takes up a proportion of up to 30%, in particular of up to 50%, of the screen (4).
K. Press screw separator in accordance with any of the previous paragraphs, characterised in that the frame (5) comprises at least one rib (53) which extends in an arcuate manner about the longitudinal axis (6).
L. Press screw separator in accordance with any of the previous paragraphs, characterised in that the screen (4) comprises a multiplicity of bars (44) which are oriented in parallel with the longitudinal axis (6).

LIST OF REFERENCE NUMERALS

1 Press screw separator
2 housing
20 outlet of the housing
21 screw connection of the frame
3 screw
4 screen
41 first screen region
42 second screen region
43 recess
44 longitudinal bar
5 frame
51 sink hole
52 threaded hole
53 rib
54 reinforcing strip
6 longitudinal axis
7 holding strip
71 combination of screw and nut

What is claimed is:

1. A press screw separator configured for separating solid components from a slurry containing solid and liquid components, comprising
   a housing,
   a frame arranged in the housing,
   a cylindrical screen which is arranged at least partially in the frame, and
   a screw adapted for pressing out the slurry, which screw is arranged within the cylindrical screen and is mounted so as to be rotationally movable about a longitudinal axis of the cylindrical screen,
   wherein the frame is mounted in the housing without any clearance, and
   further wherein a first screen region of the cylindrical screen is mounted directly in the housing, whereas a second screen region of the cylindrical screen is mounted in the frame.

2. The press screw separator as claimed in claim 1, characterised in that the frame is mounted in the housing without any clearance in a circumferential direction.

3. The press screw separator as claimed in claim 2, characterised in that the frame is screwed to the housing.

4. The press screw separator as claimed in claim 3, characterised in that the frame comprises at least one reinforcing strip which extends in parallel with the longitudinal axis.

5. The press screw separator as claimed in claim 4, characterised in that the first screen region is configured to be elastically deformable.

6. The press screw separator as claimed in claim 5, characterised in that the frame mounts the second screen region without any clearance and/or prevents deformation of the second screen region.

7. The press screw separator as claimed in claim 6, characterised in that the second screen region comprises a recess in the direction of the longitudinal axis, into which a lug of the frame engages in order to prevent rotation of the second screen region about the longitudinal axis.

8. The press screw separator as claimed in claim 7, characterised in that the frame comprises a holding strip which is connected with a screw to the frame to form the lug of the frame.

9. The press screw separator as claimed in claim 1, characterised in that the frame is screwed to the housing.

10. The press screw separator as claimed in claim 1, characterised in that the frame comprises at least one reinforcing strip which extends in parallel with the longitudinal axis.

11. The press screw separator as claimed in claim 1, characterised in that the first screen region is configured to be elastically deformable.

12. The press screw separator as claimed in claim 1, characterised in that the frame mounts the second screen region without any clearance and/or prevents deformation of the second screen region.

13. The press screw separator as claimed in claim 12, characterised in that the second screen region comprises a recess in the direction of the longitudinal axis, into which a lug of the frame engages in order to prevent rotation of the second screen region about the longitudinal axis.

14. The press screw separator as claimed in claim 13, characterised in that the frame comprises a holding strip which is configured to be connected to the frame to form the lug of the frame.

15. The press screw separator as claimed in claim 1, characterised in that the second screen region takes up a proportion of up to 30% of the cylindrical screen.

16. The press screw separator as claimed in claim 1, characterised in that the second screen region takes up a proportion of up to 50% of the cylindrical screen.

17. The press screw separator as claimed in claim 1, characterised in that the frame comprises at least one rib which extends in an arcuate manner about the longitudinal axis.

18. The press screw separator as claimed in claim 1, characterised in that the cylindrical screen comprises a multiplicity of bars which are oriented in parallel with the longitudinal axis.

* * * * *